United States Patent [19]

Sato et al.

[11] 4,233,848
[45] Nov. 18, 1980

[54] STRAIN GAUGE PRESSURE TRANSDUCER APPARATUS HAVING AN IMPROVED IMPEDANCE BRIDGE

[75] Inventors: Hideo Sato, Hitachi; Kanji Kawakami; Motohisa Nishihara, both of Katsuta, all of Japan

[73] Assignee: Hitachi, Ltd., Japan

[21] Appl. No.: 971,358

[22] Filed: Dec. 20, 1978

[30] Foreign Application Priority Data

Jan. 6, 1978 [JP] Japan ................................. 53-160
Jun. 2, 1978 [JP] Japan ................................. 53-65751

[51] Int. Cl.³ .............................................. G01L 9/06
[52] U.S. Cl. ................................. 73/727; 73/708; 73/721; 73/777; 323/75 N; 324/65 R; 324/DIG. 1
[58] Field of Search ............... 73/720, 721, 726, 727, 73/777, 766, 141 A, 708; 323/75 B, 75 N; 324/65 R, DIG. 1; 338/4

[56] References Cited

U.S. PATENT DOCUMENTS

| | | | |
|---|---|---|---|
| 3,457,493 | 7/1969 | Shoemaker et al. ..................... | 323/4 |
| 3,588,728 | 6/1971 | Elazar ............................ | 324/DIG. 1 |
| 3,654,545 | 4/1972 | Demark ............................. | 323/75 N |
| 3,836,796 | 9/1974 | Soloman et al. ...................... | 307/310 |
| 3,841,150 | 10/1974 | Pearson .............................. | 73/766 |
| 3,956,927 | 5/1976 | Pearson .............................. | 73/766 |
| 4,077,882 | 3/1978 | Gangemi ............................. | 210/90 |

*Primary Examiner*—Donald O. Woodiel
*Attorney, Agent, or Firm*—Craig & Antonelli

[57] ABSTRACT

A strain gauge pressure transducer apparatus having an impedance bridge of strain gauges formed on a thin wall semiconductor diaphragm to which a pressure to be detected is applied. Each of two arms of the impedance bridge includes two series-connected pressure transducer elements of the semiconductor strain gauges, and is electrically connected at one end thereof to each other. An operational amplifier of an excitation source supplies the impedance bridge with excitation current. That is, the output of the operational amplifier is connected to the junction of the two arms of the impedance bridge, and the inverting input thereof to the other end of one of the two arms. To the non-inverting input of the operational amplifier, a voltage signal varying in accordance with the changing of an ambient temperature is applied. Intermediate nodes of the two arms of the impedance bridge are connected to the inverting and non-inverting inputs of another operational amplifier, respectively. The output of the another operational amplifier is fed back to the other end of the other arm of the impedance bridge.

10 Claims, 4 Drawing Figures

STRAIN GAUGE PRESSURE TRANSDUCER APPARATUS HAVING AN IMPROVED IMPEDANCE BRIDGE

BACKGROUND OF THE INVENTION

The present invention relates to an electric apparatus, more particularly to a pressure transducer apparatus having an impedance bridge of semiconductor strain gauge.

As pressure transducers, various transducer apparatus utilizing semiconductor strain gauges have been proposed and employed in the past because of a relatively high sensitivity to strain or a high gauge factor. In a conventional strain gauge transducer, for example, an impedance bridge and transmitter-receiver apparatus are provided, wherein the bridge is mainly composed of four semiconductor pressure sensing elements or strain gauges and a differential amplifier in the transmitter-receiver apparatus is coupled to the bridge. In the connection between the impedance bridge and the transmitter-receiver apparatus, however, the input impedance of the differential amplifier must be selected at a value much greater than that of the impedance bridge including the input resistors of the differential amplifier so that the mutual reaction should be removed.

In U.S. Pat. No. 3,836,796, there is disclosed a semiconductor pressure transducer having an impedance bridge of piezoresistive elements, wherein the bridge comprises four equal value diffused resistors formed on a thin wall semiconductor diaphragm, and to the bridge a series circuit of an operational amplifier and a buffer amplifier is coupled. And the operational amplifier raises the output signal received from the bridge via the buffer amplifier to the desired output level.

In the circuit mentioned above, however, the buffer amplifier which is provided for isolation of the bridge from the impedance variation in subsequent stage causes disadvantages. That is, such apparatus has complex construction, and therefore increases the production cost as well as the process of manufacturing. Further, the reliability of the apparatus is relatively low as the result of the error factor of the buffer amplifier.

The semiconductor strain gauges, as mentioned above, have relatively high sensitivity to strain, and are temperature sensitive. In U.S. Pat. No. 3,654,545, an impedance bridge is further provided with temperature compensating means composed of two thermistors, each of which is connected in parallel to slidewires in respective arms of the impedance bridge. Such temperature compensating means of the thermistors, however, increases expense of fabrication.

Other relevant prior arts are as follows:
(1) U.S. Pat. No. 3,841,150, issued on Oct. 15, 1974, "STRAIN GAUGE TRANSDUCER SIGNAL CONDITIONING CIRCUITRY;"
(2) U.S. Pat. No. 3,457,493, issued on July 22, 1969, "MULTIPLE CONSTANT CURRENT SUPPLY;" and
(3) U.S. Pat. No. 3,956,927, issued May 18, 1976, "STRAIN GAUGE TRANSDUCER APPARATUS."

SUMMARY OF THE INVENTION

An object of the present invention is to provide a stain gauge pressure transducer apparatus having a relatively high sensitivity as well as simplified construction.

Another object of the present invention is to provide a strain gauge pressure transducer apparatus capable of compensation of the changes of the strain gauges due to the ambient temperature, i.e. the change in the resistance and the change in the sensitivity.

Further, another object of the present invention is to provide a strain gauge pressure transducer apparatus free from the above-mentioned drawbacks of the conventional apparatus.

The objects mentioned above are achieved by a strain gauge pressure transducer apparatus comprising: an impedance bridge having first and second arms, each of which includes two series-connected semiconductor pressure transducer elements formed on a thin wall semiconductor diaphragm to which a pressure to be detected is applied, one end of each of the first and second arms being electrically connected to each other; an exitation source, one pole of which is connected to the said ends of the first and second arms of said impedance bridge and the other to the other end of the first arm; and an operational amplifier having inverting and non-inverting inputs which are respectively connected to intermediate nodes of the first and the second arms of said impedance bridge, the output of the operational amplifier being electrically connected to the other end of the second arm.

The other objects of the present invention mentioned above are achieved by a strain gauge pressure transducer apparatus comprising an excitation source for supplying said impedance bridge with excitation current depending on ambient temperature, and/or means for applying the voltage equal to the voltage appearing at the intermediate nodes of the balanced impedance bridge at a specified ambient temperature to either of the intermediate nodes of the first and second arms of said impedance bridge.

The objects mentioned above and other objects and advantages of the present invention will become more apparent from the following detailed description of the preferred embodiment given by reference to the accompanying drawings.

DETAILED DESCRIPTION OF PREFERRED EMBODIMENT

Figure 1:
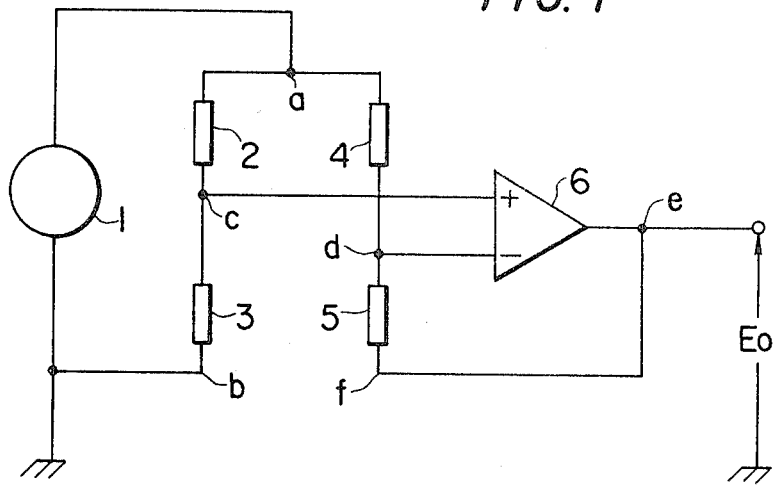
FIG. 1 serves to explain the principle operation of a strain gauge pressure transducer apparatus in accordance with the present invention.

Referring now to FIG. 1 of the attached drawings, wherein the principle operation of a strain gauge pressure transducer apparatus constructed in accordance with the present invention will be explained, one pole of an excitation source 1 is electrically connected to a node a of two arms of an impedance bridge, each arm being composed respectively of two pressure transducer elements 2 and 3 or 4 and 5, while the other pole of source 1, as well as the end b of the arm of the pressure transducer elements 2 and 3, is directly grounded. Other nodes designated by c and d of these two arms of the impedance bridge are connected to the non-inverting and the inverting inputs of a high gain voltage amplifier or an operational amplifier (OP amplifier) 6. The output of the OP amplifier 6 is designated by e and connected to the lower end f of the arm of the pressure transducer elements 4 and 5.

Assuming that the excitation source 1 is a current source and that the impedances of the pressure transducer elements 2, 3, 4 and 5 are represented by $R_2$, $R_3$, $R_4$ and $R_5$, respectively, the output signal appearing at the output e of the OP amplifier 6 can be described as follows;

$$E_0 = \frac{R_3 \cdot R_4 - R_2 \cdot R_5}{R_2 + R_4} \cdot I_S \tag{1}$$

wherein, $I_S$ represents the amount of current supplied by the excitation source 1 or the current source.

The pressure transducer elements 2 through 5, for example four piezoresistive elements formed on a thin wall semiconductor diaphragm, one pair thereof in the radial direction and the other in the tangential direction, show the following impedances to the pressure applied to the diaphram;

$$R_2 = R_5 = R_0(1 - \gamma \cdot X) \tag{2}$$

$$R_3 = R_4 = R_0(1 + \gamma \cdot X) \tag{3}$$

wherein, $R_0$ represents initial equal value impedances of the four pressure transducer elements 2 through 5, $\gamma$ the pressure-impedance conversion factors thereof, and X the physical quantity of the pressure applied to the diaphram. That is, the pressure transducer elements 2 and 5 have the impedances $R_2$ and $R_5$ decreasing in accordance with the increase of the applied pressure, whereas the pressure elements 3 and 4 have the impedances $R_3$ and $R_4$ increasing.

Putting the equations (2) and (3) into the equation (1), the output signal $E_0$ becomes as follows:

$$E_0 = 2R_0 \cdot \gamma \cdot X \cdot I_S \tag{4}$$

The output signal $E_0$, as is apparent from the above equation (4), is directly proportional to the physical quantity X of the pressure applied to the diaphram.

The same result, i.e. the output signal proportional to the pressure, can be obtained by utilizing a voltage source as the exciting source.

The semiconductor strain gauges, however as mentioned previously, are temperature sensitive, and therefore the compensation for the temperature must be made in order to obtain accurate pressure detection. The detail of an embodiment including such temperature compensation will be given hereinafter.

Figure 2:
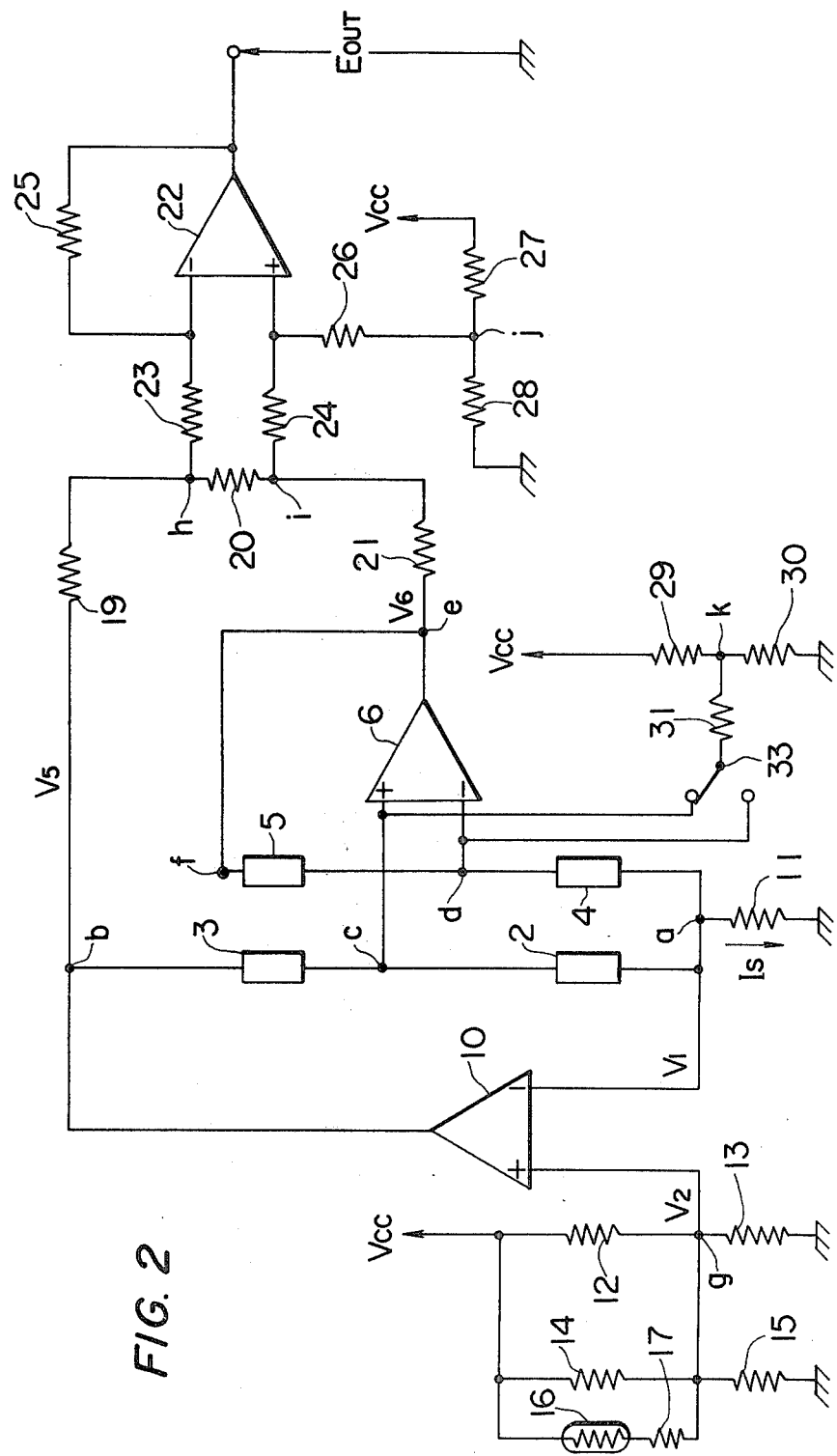
FIG. 2 is a circuit diagram of an embodiment constructed in accordance with the present invention.

Referring now to FIG. 2, wherein like reference numerals and/or symbols designate like elements shown in FIG. 1, the impedance bridge composed of the four pressure transducer elements 2, 3, 4 and 5 is excited by exciting current, the amount of which is controlled by an OP amplifier 10 having an output connected to the end b of the arm of the transducer elements 2 and 3. To the inverting input of the OP amplifier 10, a voltage signal proportional to the amount of current supplied to the impedance bridge is applied. Namely, the node a of the two arms is electrically connected through a resistor 11 to ground, and therefore the sum of the current flowing through the two arms flows therethrough. On the other hand, the non-inverting input of the OP amplifier 10 is provided with a voltage signal appearing at a junction g between series-connected resistors 12 and 13, to each of which respective resistors 14 or 15 are connected in parallel. Further, a temperature sensitive element such as a thermistor 16 together with a series-connected resistor 17 is connected to the resistor 14 in parallel. Consequently, the voltage signal at the junction g varies depending on the changing of the ambient temperature so as to compensate the adverse effect due to the changing in the span and the sensitivity or gauge factor of the strain gauges.

Pressure transducer elements 2, 3, 4 and 5 are piezoresistive elements formed on the thin wall semiconductor diaphram. The nodes c and d of the two arms of the bridge are connected to the non-inverting and the inverting inputs of the OP amplifier 6, respectively, and the output of the OP amplifier 6 is fed back to the end f of the arm of the pressure transducer elements 4 and 5. Therefore, the voltage directly proportional to the pressure appears between the end b and the output terminal e of the OP amplifier 6.

In this embodiment, though the voltage between the points b and e can be directly utilized as a pressure signal, the voltage is further amplified to the desired output level. Between the points b and e mentioned above, three series-connected resistors 19, 20 and 21 are connected, and the voltage across the resistor 20 is amplified and provided as an output signal $E_{OUT}$ at the output terminal of an OP amplifier 22. That is, both ends h and i of the resistor 20 are connected to the inverting and the non-inverting inputs of the OP amplifier 22 through resistors 23 and 24, respectively. To the inverting input of the OP amplifier 22, an output $E_{OUT}$ is fed back through a resistor 25, and to the non-inverting input thereof a reference voltage is applied through a resistor 26. The reference voltage is provided at the junction j of series-connected resistors 27 and 28, across which the source voltage $V_{CC}$ is applied.

For the purpose of compensation of the adverse effect of ambient temperature variation upon the initial offset of the impedance bridge, i.e. the voltage appearing across the output terminals of the impedance bridge for zero unbalance, a voltage which is produced at a junction k of series-connected resistors 29 and 30 is applied through a resistor 31 to the one of the nodes c and d of the impedance bridge. Across the series-connected resistors 29 and 30, the source voltage $V_{CC}$ is applied, and the selection of the node c or d is achieved by means of a change-over switch 33.

The operation of the embodiment mentioned above will be given hereinafter.

The OP amplifier 10 controls the amount of the current supplied to the impedance bridge so that the voltage $V_1$ at the node a becomes equal to the voltage $V_2$ at the junction g. The amount of the current i.e. the current flowing through the resistor 11, therefore, can be described by the following equation;

$$I_S = \frac{V_1}{R_{11}} = \frac{V_2}{R_{11}} \tag{5}$$

wherein $R_{11}$ represents the resistance value of the resistor 11.

On the other hand, the output of the OP amplifier 6, that is the voltage difference between the voltage $V_5$ at the point b and the voltage $V_6$ at the output terminal e of the OP amplifier 6, as is apparent from the previous explanation of the principle operation, can be described as follows;

$$V_5 - V_6 = \frac{R_3 \cdot R_4 - R_2 \cdot R_5}{R_2 + R_4} \cdot I_S \quad (6)$$

wherein $R_2$ to $R_5$ represents the respective impedances of the pressure transducer elements 2 to 5. Because the semiconductor strain gauges of the pressure transducer elements 2 to 5, as mentioned previously, are temperature sensitive, the impedances $R_2$ to $R_5$ can be described by the following equations including items of the ambient temperature therein;

$$R_2 = R_5 = R_0(1 + \alpha \cdot T)\{1 - \gamma \cdot X \cdot (1 + \beta \cdot T)\} \quad (7)$$

$$R_3 = R_4 = R_0(1 + \alpha \cdot T)\{1 + \gamma \cdot X \cdot (1 + \beta \cdot T)\} \quad (8)$$

wherein T represents the ambient temperature with respect to a specific temperature, $\alpha$ the temperature coefficient with respect to the span of the strain gauges, and $\beta$ the temperature coefficient with respect to the sensitivity of the gauges. Putting the equations (7) and (8) into the equation (6), the output $V_5 - V_6$ becomes as follows:

$$\begin{aligned}V_5 - V_6 &= 2 \cdot R_0 \cdot \gamma \cdot X \cdot (1 + \alpha \cdot T) \cdot (1 + \beta \cdot T) \cdot I_S \\ &\approx 2 \cdot R_0 \cdot \gamma \cdot X \cdot \{1 + (\alpha + \beta) \cdot T\} \cdot I_S\end{aligned} \quad (9)$$

The voltage $V_2$ at the junction g of the series-connected resistors 12 and 13 can be set at the voltage described by the following equation by adjusting the resistors 14, 15 and 17 and the thermistor 16. Thus, the equation is;

$$\begin{aligned}V_2 &= \frac{R_{12}}{(R_{12} + R_{13})(1 + \alpha \cdot T)(1 + \beta \cdot T)} \cdot V_{CC} \\ &\approx \frac{R_{12}}{(R_{12} + R_{13})\{1 + (\alpha + \beta)T\}} \cdot V_{CC}\end{aligned} \quad (10)$$

wherein $R_{12}$ and $R_{13}$ represent the resistance values of the resistors 12 and 13, respectively.

On the other hand, from the equation (5), the current $I_S$ can be described by the following equation:

$$I_S = \frac{V_1}{R_{11}} = \frac{V_2}{R_{11}} = \frac{R_{12}}{R_{11}(R_{12} + R_{13})\{1 + (\alpha + \beta)T\}} \cdot V_{CC} \quad (11)$$

Consequently, the output $V_5 - V_6$ of the equation (9) becomes as follows:

$$V_5 - V_6 = \frac{2 \cdot R_0 \cdot \gamma \cdot X \cdot R_{12}}{R_{11}(R_{12} + R_{13})} \cdot V_{CC} \quad (12)$$

As is apparent from the above equation (12), the output $V_5 - V_6$ does not include the temperature coefficient $\alpha$ of the span or the coefficient $\beta$ of the sensitivity or the gauge factor. Thus, it may be said that the adverse effect caused by the changing in the span and the sensitivity of the strain gauge is compensated.

The voltage at the junction k between the series-connected resistors 29 and 30 is set at the voltage equal to that appearing at the node c or d of the balanced impedance bridge at a specified ambient temperature, for example at 20° C., and is applied through the resistor 31 to either the node c or d. When the ambient temperature increases or decreases, the voltage at the junction k mentioned above, or the intermediate node voltage of the balanced bridge will differ from the voltage at the node c or d, and current proportional to the above difference will flow through the resistor 31. This current flow causes voltage difference between the node b and the node f of the arms of the impedance bridge. The polarity of the voltage depends on which of the nodes c and d the voltage at the junction k is applied to.

Assuming that the voltage at the junction k is applied to the node d and that the gain of the OP amplifier 22 is G, the output signal change $\Delta E_{OUT}$ resulting from the application of the voltage at the junction k becomes as follows:

$$\Delta E_{OUT} = \quad (13)$$

$$\frac{R_5}{R_{31}} \left\{ \left( R_{11} + \frac{R_2 \cdot R_4}{R_2 + R_4} \right) \cdot I_S - \frac{R_{30}}{R_{29} + R_{30}} \cdot V_{CC} \right\} \cdot G$$

wherein $R_{29}$, $R_{30}$ and $R_{31}$ represent the resistance values of the resistors 29, 30 and 31, respectively.

For easy and better understanding, it is assumed that the physical quantity X of the pressure is zero. At the temperature equal to the specific ambient temperature (20° C.), because the voltage at the junction k is equal to the voltage at the node c or d of the balanced impedance bridge, the relationship described by the following equation is established between the current $I_S$ and the source voltage $V_{CC}$:

$$\left( R_{11} + \frac{R_0}{2} \right) \cdot I_S = \frac{R_{30}}{R_{29} + R_{30}} \cdot V_{CC} \quad (14)$$

Further, the impedances $R_2$, $R_3$ and $R_4$ of the pressure transducer elements 2, 3 and 4 become as follows:

$$R_2 = R_3 = R_4 = R_5 = R_0(1 + \alpha \cdot T) \quad (15)$$

Putting equations (14) and (15) into the equation (13), the output signal change $\Delta E_{OUT}$ becomes as follows:

$$\begin{aligned}\Delta E_{OUT} &= \frac{R_0(1 + \alpha \cdot T)}{R_{31}} \cdot \frac{\alpha \cdot T \cdot R_0}{2} \cdot I_S \cdot G \\ &\approx \frac{R_0^2}{R_{31}} \cdot \alpha \cdot T \cdot I_S \cdot G\end{aligned} \quad (16)$$

As is apparent from the above equation, the output signal change $\Delta E_{OUT}$ caused by the application of the voltage at junction k, or the intermediate node voltage of the balanced bridge, to the node d is directly proportional to the variation of the temperature T.

Figure 3:
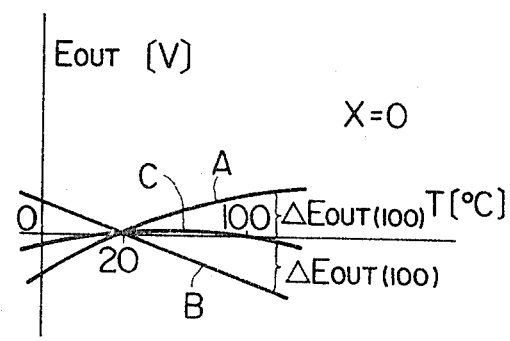
FIG. 3 is a graph showing a variation of an output of the embodiment shown in FIG. 2 against the ambient temperature under the zero pressure.

In FIG. 3, wherein the temperature T is the horizontal coordinate axis and the output signal $E_{OUT}$ is the vertical coordinate axis, the output signal $E_{OUT}$ without the compensation by the application of the intermediate node voltage of the balanced bridge is drawn as curve A. On the other hand, the output signal change $\Delta E_{OUT}$ caused by the application of the intermediate node voltage of the balanced bridge is drawn as line B. As is apparent from the FIG. 3, the error voltage appearing at the output terminals of the bridge due to the temperature variation can be substantially compensated by adjusting the resistance value of the resistor 31. That is, the resistance value of the resistor 31 is selected at the value $R_{31}$ described by the following equation:

$$R_{31} = \frac{R_0^2}{\Delta E_{OUT}} \cdot \alpha \cdot T \cdot I_S \cdot G \quad (17)$$

For example, the output signal $E_{OUT}$ is drawn as curve C which appears when the error voltage due to the temperature variation is compensated. In this case, the resistance value $R_{31}$ of the resistor 31 is determined by the following equation.

$$R_{31} = \frac{R_0^2}{\Delta E_{OUT(100)}} \cdot \alpha \cdot (100 - 20) \cdot I_S \cdot G \qquad (18)$$

wherein $\Delta E_{OUT(100)}$ is the change of the output signal shown by the curve A at the temperature 100° C. The initial resistance value $R_0$, the temperature coefficient $\alpha$ of the span of the semiconductor strain gauge, the current $I_S$ and the gain G can be easily determined experimentally. Further, when the temperature T is less than the specific temperature (20° C.), the voltage at the junction k, or the intermediate node voltage of the balanced bridge, should be led to the node c instead of the node d by changing over the switch 33.

Figure 4:
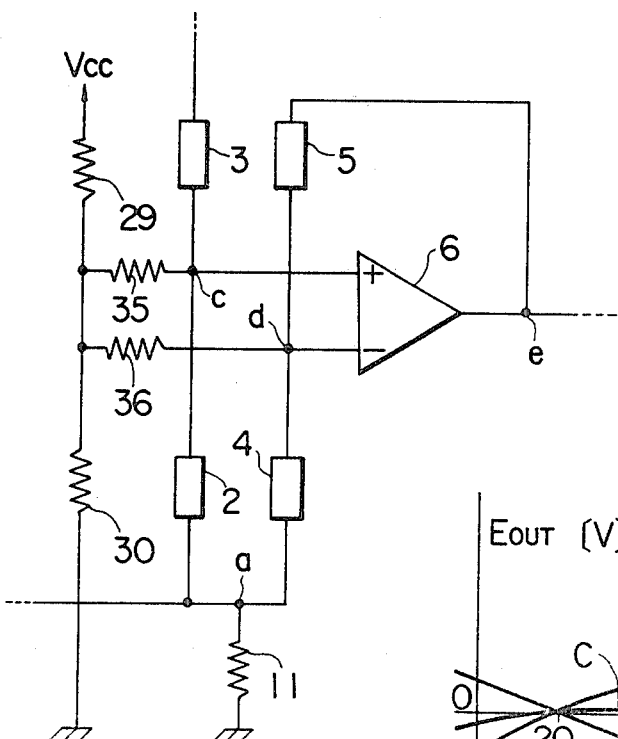
FIG. 4 shows the circuit diagram of one variation of the embodiment shown in FIG. 2.

Further in FIG. 4, wherein like reference numerals designate like elements shown in FIG. 2, there is shown a variation of the embodiment mentioned above. In this variation, the voltage appearing at the junction between the series-connected resistors 29 and 30, or the intermediate node voltage of the bridge mentioned previously, is applied to both of the non-inverting and the inverting inputs of the OP amplifier 6 through respective resistors 35 and 36, instead of by provision of the changing-over switch.

What we claim:

1. A strain gauge pressure transducer apparatus comprising: an impedance bridge having first and second arms, each of which includes two series-connected pressure transducer elements of strain gauges formed on a thin wall semiconductor diaphragm to which a pressure to be detected is applied, first ends of the first and the second arms being electrically connected to each other;
   an excitation source, one pole of which is connected to the junction to said first ends of the first and the second arms of said impedance bridge and the other pole to the other end of the first arm; and
   an operational amplifier having non-inverting and inverting inputs which are respectively connected to intermediate nodes of the first and the second arms of said impedance bridge, the output of the operational amplifier being electrically connected to the other end of the second arm of said impedance bridge.

2. A strain gauge pressure transducer apparatus as claimed in claim 1, wherein one of the pressure transducer elements of each of the first and the second arms of said impedance bridge has an impedance increasing in accordance with the increase of the applied pressure, whereas the other elements of the said first and second arms have impedances decreasing in accordance with the applied pressure.

3. A strain gauge pressure transducer apparatus as claimed in claim 1, wherein said excitation source comprises;
   means for detecting the amount of current supplied to said impedance bridge;
   means for generating a voltage signal varying depending on the changing of an ambient temperature; and
   means for controlling the amount of current supplied to said impedance bridge in accordance with the comparison between the signal from said current detecting means and the signal from said voltage signal generating means.

4. A strain gauge pressure transducer apparatus as claimed in claim 3, wherein said voltage signal generating means comprises a thermistor for compensating the current to be supplied to said bridge depending on the changing of the temperature.

5. A strain gauge pressure transducer apparatus as claimed in claim 4, wherein said current controlling means comprises a differential amplifier for comparing the signals from said current detecting means and the signal generating means.

6. A strain gauge pressure transducer apparatus as claimed in claim 1, further comprising means for generating an intermediate node voltage equal to the voltage appearing at the intermediate nodes of said impedance bridge when said impedance bridge is balanced at a specific temperature, and means for applying the intermediate node voltage of said intermediate node voltage generating means to one of the intermediate nodes of said impedance bridge.

7. A strain gauge pressure transducer apparatus as claimed in claim 6, wherein said intermediate node voltage generating means comprises series-connected resistors, and the junction thereof is led to the one of the intermediate nodes of said impedance bridge through a resistor.

8. A strain gauge pressure transducer apparatus as claimed in claim 6, wherein said intermediate node voltage applying means comprises a changing-over switch.

9. A strain gauge pressure transducer apparatus as claimed in claim 1, further comprising means for generating an intermediate node voltage equal to the voltage appearing at the intermediate nodes of said impedance bridge when said impedance bridge is balanced at a specific temperature, and means applying the intermediate node voltage of said intermediate node voltage generating means to both of the nodes of said impedance bridge.

10. A strain gauge pressure transducer apparatus claimed in claim 9, wherein said intermediate node voltage generating means comprises series-connected resistors, and the junction thereof is led to both of the intermediate nodes of said impedance bridge through respective resistors.

* * * * *